United States Patent
Husak et al.

(10) Patent No.: US 10,382,735 B2
(45) Date of Patent: Aug. 13, 2019

(54) TARGETED DISPLAY COLOR VOLUME SPECIFICATION VIA COLOR REMAPPING INFORMATION (CRI) MESSAGING

(71) Applicant: Dolby Laboratories Licensing Corporation, San Francisco, CA (US)

(72) Inventors: Walter J. Husak, Simi Valley, CA (US); Robin Atkins, Campbell, CA (US); Peng Yin, Ithaca, NY (US); Taoran Lu, Santa Clara, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 20 days.

(21) Appl. No.: 15/724,009

(22) Filed: Oct. 3, 2017

(65) Prior Publication Data
US 2018/0098046 A1    Apr. 5, 2018

Related U.S. Application Data

(60) Provisional application No. 62/403,834, filed on Oct. 4, 2016.

(51) Int. Cl.
| | |
|---|---|
| *H04N 11/20* | (2006.01) |
| *H04N 9/77* | (2006.01) |
| *H04N 7/08* | (2006.01) |
| *H04N 5/20* | (2006.01) |
| *H04N 9/67* | (2006.01) |

(52) U.S. Cl.
CPC ........... *H04N 11/20* (2013.01); *H04N 5/20* (2013.01); *H04N 7/08* (2013.01); *H04N 9/67* (2013.01); *H04N 9/77* (2013.01)

(58) Field of Classification Search
CPC ........................................................ H04N 11/20
USPC ............................................................ 348/453
See application file for complete search history.

(56) References Cited

U.S. PATENT DOCUMENTS

| 8,593,480 B1 | 11/2013 | Ballestad | |
|---|---|---|---|
| 2015/0341611 A1* | 11/2015 | Oh ...................... | H04N 9/8722 386/230 |
| 2016/0005349 A1 | 1/2016 | Atkins | |

(Continued)

OTHER PUBLICATIONS

"HEVC Screen Content Coding Draft Text 6", JCTVC-W1005, Mar. 2016, San Diego, USA.

(Continued)

*Primary Examiner* — Jefferey F Harold
*Assistant Examiner* — Justin B Sanders

(57) ABSTRACT

Given existing color remapping information (CRI) messaging variables, methods are described to communicate color volume information for a targeted display to a downstream receiver. Bits 7:0 of the 32-bit colour_remap_id are used to extract a first value. If the first value is not a reserved value, then the first value is used as an index to a look-up table to generate a first luminance value for a targeted display, otherwise a second value is generated based on bits 31:9 in the colour_remap_id messaging variable and the first luminance value for a targeted display is generated based on the second value. The methods may be applied to communicate via CRI messaging a minimum luminance value, a maximum luminance value, and color primaries information of the targeted display.

14 Claims, 3 Drawing Sheets

(56) References Cited

U.S. PATENT DOCUMENTS

2016/0150180 A1* 5/2016 Kozuka .............. H04N 5/913
386/254

OTHER PUBLICATIONS

SMPTE ST 2094-1:2016: "Dynamic Metadata for Color Volume Transform~Core Components" May 18, 2016.
SMPTE ST 2096-30:2016, "Dynamic Metadata for Color Volume Transform—Application #3" Jul. 6, 2016.
ITU-T H.265, "Coding of Moving Video" published in Apr. 2015, in Annex D.2.32.
ITU Rec.BT 1886 "Reference Electro-Optical Transfer Function for Flat Panel Displays used in HDTV Studio Production" Mar. 2011.
SMPTE ST 2084:2014 "High Dynamic Range EOTF of Mastering Reference Displays", SMPTE 2014.
ITU-R BT. 2100 "Image Parameter Values for High Dynamic Range Television for Use in Production and International Programme Exchange" ITU, Jul. 2016.

* cited by examiner

US 10,382,735 B2

TARGETED DISPLAY COLOR VOLUME SPECIFICATION VIA COLOR REMAPPING INFORMATION (CRI) MESSAGING

CROSS-REFERENCE TO RELATED APPLICATIONS

This application claims the benefit of priority to U.S. Provisional Patent Application Ser. No. 62/403,834, filed on Oct. 4, 2016, which is incorporated herein by reference in its entirety.

TECHNOLOGY

The present invention relates generally to images. More particularly, an embodiment of the present invention relates to communicating targeted display color volume information using supplementary (SEI) messaging related to color remapping information (CRI).

BACKGROUND

Recommendation ITU-T H.265 (also known as HEVC) for "coding of moving video," published in April 2015 by the ITU, which is incorporated herein by reference in its entirety, in Annex D.2.32 "Colour remapping information SEI message syntax" and D.3.32 "Colour remapping information SEI message semantics," typically referred to as "CRI messaging," describes the syntax for providing supplemental enhancement information (SEI) to enable a decoder to remap the reconstructed color samples of the output pictures. It uses a color remapping model that includes a first ("pre") piece-wise linear function, a 3×3 matrix, and a second ("post") piece-wise linear function, thus allowing remapping color values to a specific color volume of a targeted display.

In parallel with the MPEG/ITU standardization processes, the society of motion picture and television engineers (SMPTE) has also defined a number of Recommendations related to communicating metadata for color volume transforms. For example, SMPTE ST 2096-30:2016, "Dynamic Metadata for Color Volume Transform—Application #3," Jul. 6, 2016, which is incorporated herein by reference, which is part of the SMPTE 2096 family of recommendations, defines the syntax for dynamic metadata generated when a content creator produces a "standard dynamic range (SDR) grade" master from an original "high dynamic range (HDR) grade" master. These metadata can be used by a downstream SDR rendering device to provide a color volume transform so that the displayed image closely matches the artistic intent in the "SDR grade" image. As used herein, the term "metadata" relates to any auxiliary information that is transmitted as part of the coded bitstream and assists a decoder to render a decoded image. Such metadata may include, but are not limited to, color space or gamut information, prediction parameters, reference display parameters, and auxiliary signal parameters, as those described herein.

While Annex D of H.265 supports a number of metadata defined by earlier SMPTE ST-2094 recommendations, it does not carry all the required metadata for the latest versions. To improve existing decoding schemes, as appreciated by the inventors here, improved techniques for utilizing the existing CRI syntax for communicating color remapping information is required.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Techniques for communicating target display color volume information using supplementary (SEI) messaging related to color remapping information (CRI) are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to techniques for communicating targeted display color volume information using supplementary (SEI) messaging related to color remapping information (CRI). A processor for extracting CRI messaging receives the H.265 colour_remap_id messaging variable comprising 32 bits of information. It extracts bits 7:0 of the 32-bit colour_remap_id to generate a first value. If the first value is not a reserved value, then the first value is used by the processor as an index to a look-up table to generate a first luminance value for a targeted display, otherwise the processor generates a second value based on bits 31:9 in the colour_remap_id messaging variable. Then, the second value is used to generate the first luminance value for the targeted display.

In an embodiment, the first luminance value corresponds to the minimum or the maximum luminance value in the targeted display.

The methods may be applied to communicate via CRI messaging a minimum luminance value, a maximum luminance value, and color primaries information of the targeted display.

In an embodiment, the second value may be representing a luminance value for the targeted display encoded according to the inverse EOTF of SMPTE ST 2084.

Examples of CRI Messaging

Figure 1:
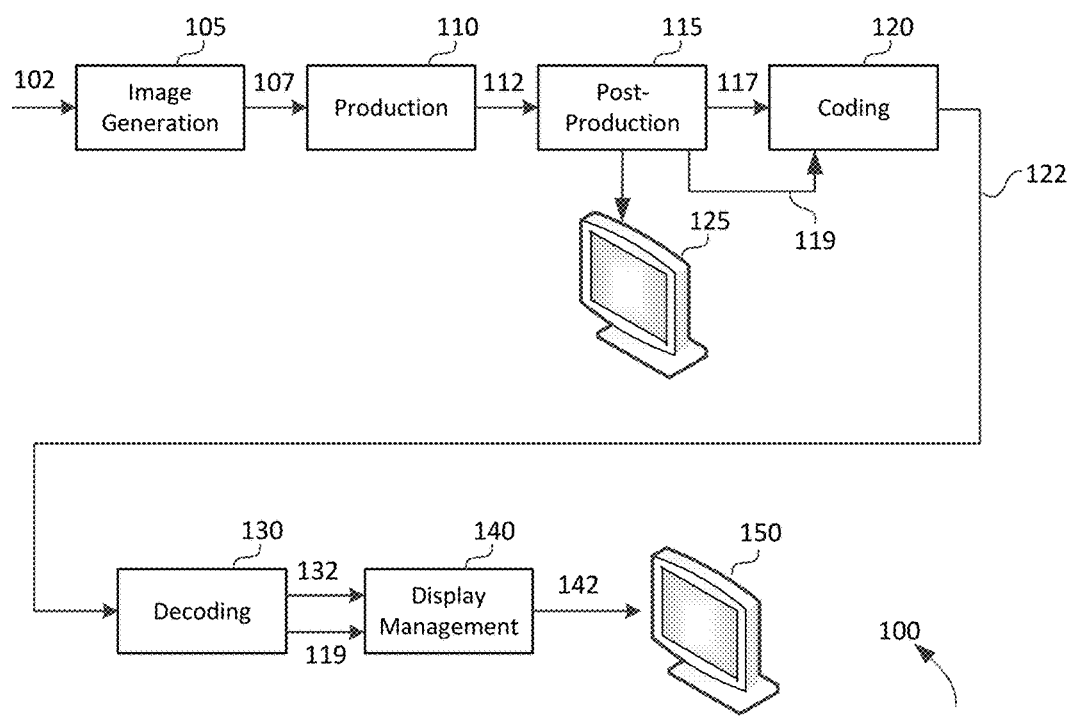
FIG. 1 depicts an example process for a video delivery pipeline.

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125) (also to be referred to as the "targeted display"). At this stage, metadata (119), for example as defined in SMPTE ST 2094-1:2016, *"Dynamic Metadata for Color Volume Transform—Core components,"* SMPTE, May 18, 2016, incorporated herein by reference, may be incorporated into the input stream, for example, as part of SEI messaging. Such metadata may define the characteristics of the targeted display (125) and color remapping information so that a downstream receiver can render the decoded data in the best possible way.

Following post-production (115), video data of final production (117) and associated metadata (119) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). Coded bitstream (122) may be represented by a single layer video coded bitstream or by a multi-layer bitstream. For example, in a multi-layer bitstream, signal (122) may include a base layer (say, an SDR layer or a 10-bit HDR (HDR10) layer) and an enhancement layer, which when combined with the base layer yields a HDR bitstream with higher dynamic range than the base layer alone (e.g., a 12-bit HDR signal). Signal (122), the output bitstream from the encoder (120) may also include metadata (119) and additional coding-related metadata, such as prediction parameters and other data to assist a decoder to better reconstruct an HDR signal.

In a receiver, the coded bit stream (122) is decoded by decoding unit (130) to generate a decoded signal (132) and associated metadata. The receiver display (150) may have completely different characteristics than the reference (or targeted) display (125). For example, without limitation, the reference display (125) may be a 1,000 nits display while the receiver display may be a 500 nits display. In that case, a display management module (140) may be used to map the dynamic range of decoded signal (132) to the characteristics of the receiver display (150) by generating display-mapped signal (142). As used herein, the term "display management" denotes the processing (e.g., tone and gamut mapping) required to map an input video signal of a first dynamic range (e.g., 1000 nits) to a display of a second dynamic range (e.g., 500 nits). Display management unit (140) may take into consideration metadata (119) to improve the quality of the output video on display (150).

As defined in SMPTE 2094-1, the characteristics of a targeted display may include each of the color primaries, white point chromaticity, minimum luminance, and maximum luminance. In H.265, the existing CRI syntax may be used to communicate the color primaries and the white point chromaticity for the targeted display; however, there is no syntax to support specifying the minimum and maximum luminance of the targeted display. For example, as shown in U.S. Pat. No. 8,593,480, "Method and apparatus for image data transformation," by A. Ballestad and A. Kostin, and U.S. Patent Publication US2016/0005349, "Display management for high dynamic range video," by R. Atkins et al., each of which is incorporated herein by reference, information about the luminance range of the targeted (or reference) display (e.g., 125) may be used on a receiver to better map the dynamic range of the video content into the receiver display (e.g., 150). Given that at this time it is not possible to extend the existing syntax of CRI messaging to support specifying the luminance range of a targeted display, alternative methods, using the existing syntax are proposed herein.

Extending the Use of the CRI colour_remap_id Parameter

One of the H.265 CRI messaging parameters is the colour_remap_id parameter, which in H.265 (April 2015) is defined in Section D.3.32 as follows:

"colour_remap_id contains an identifying number that may be used to identify the purpose of the colour remapping information. The value of colour_remap_id shall be in the range of 0 to $2^{32}-2$, inclusive.

Values of colour_remap_id from 0 to 255 and from 512 to $2^{31}-1$ may be used as determined by the application. Values of colour_remap_id from 256 to 511, inclusive, and from $2^{31}$ to $2^{32}-2$, inclusive are reserved for future use by ITU-T|ISO/IEC. Decoders shall ignore all colour remapping information SEI messages containing a value of colour_remap_id in the range of 256 to 511, inclusive, or in the range of $2^{31}$ to $2^{32}-2$, inclusive, and bitstreams shall not contain such values.

NOTE 2—The colour_remap_id can be used to support different colour remapping processes that are suitable for different display scenarios. For example, different values of colour_remap_id may correspond to different remapped colour spaces supported by displays."

In the following sections, a number of embodiments describe methods to use the colour_remap_id to communicate desirable metadata related to the color volume of the targeted system display.

A. Carrying Luminance Information Only

In an embodiment, the variable colour_remap_id is used to specify only the minimum and maximum luminance values of the targeted display. Two scenarios may be considered here. First, in a real-time broadcasting application, where CRI messaging may need to be generated in real time. Second, in an over the top (OTT) and pre-packaged media kind of application, where CRI messaging can be generated offline. In the first scenario, due to the computational overhead and limited computing resources, one may prefer to limit the number of supported luminance ranges. In one embodiment, a lookup table is used and a fixed set of luminance ranges are supported. For example, without limitation, a logarithmic distribution of luminance values can be used. In the second, non-real-time, scenario, where more computational resources are typically available, additional sets of luminance values could be supported, up to the full range defined by SMPTE ST 2094:

The TargetedSystemDisplayMaximumLuminance value shall be in the range [1, 10000];

The TargetedSystemDisplayMinimumLuminance shall be in the range [0, 100];

The TargetedSystemDisplayMinimumLuminance value shall be less than the TargetedSystemMaximumLuminance A reference electro-optical transfer function (EOTF) for a given display characterizes the relationship between color values (e.g., luminance) of an input video signal to output screen color values (e.g., screen luminance) produced by the display. For example, ITU Rec. BT. 1886, "Reference electro-optical transfer function for flat panel displays used in HDTV studio production," ITU, March 2011, defines the reference EOTF for flat panel displays based on measured characteristics of the Cathode Ray Tube (CRT). Given a video stream, information about its EOTF or inverse EOTF or OETF is typically embedded in the bit stream as metadata (e.g., video usability information (VUI) metadata).

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014, *"High Dynamic Range EOTF of Mastering Reference Displays,"* SMPTE, 2014, which is incorporated herein by reference and Rec. ITU-R BT. 2100, *"Image parameter values for high dynamic range television for use in production and international programme exchange,"* ITU, July 2016. Signals encoded using SMPTE ST 2084 may also be referred to as being "PQ-coded," to distinguish them from traditional signals which were "gamma-coded."

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example PQ mapping function is described in SMPTE ST 2084:2014, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidentally may have a very rough similarity to the way the human visual system responds, a PQ curve imitates the true visual response of the human visual system using a relatively simple functional model. For example, under SMPTE ST 2084, at 1 cd/m², one 12-bit code value corresponds to a relative change of approximately 0.0048 cd/m²; however, at 1,000 cd/m², one 12-bit code value corresponds to a relative change of approximately 2.24 cd/m². This non-linear quantization is needed to accommodate for the non-linear contrast sensitivity of the human visual system (HVS).

While embodiments described herein refer to linear, gamma-coded, or PQ-coded signals, people with ordinary skill in the art will appreciate that they can be easily extended to other coding schemes, such as Hybrid-log gamma (HLG), as described in Rec. ITU-R BT. 2100.

Denote as target_max_lum, the maximum luminance of the targeted system, and target_min_lum, the minimum luminance of the targeted system.

For a PQ-coded system, let the corresponding values be defined as target_max_PQ, and target_min_PQ.

For example, these PQ-coded values may correspond to the Maximum PQ-encoded maxRGB, and Minimum PQ-encoded maxRGB values defined in SMPTE 2094-10:2016, "Dynamic Metadata for Color Volume Transform—Application #1, SMPTE, May 18, 2016, which is incorporated herein by reference, which defines the variable PQ-encoded maxRGB as the maximum RGB value as defined in SMPTE ST 2094-1 ("maximum of color component values {R,G,B} of a pixel") and encoded according to the Reference inverse-EOTF specified in SMPTE ST 2084.

Figure 2A:
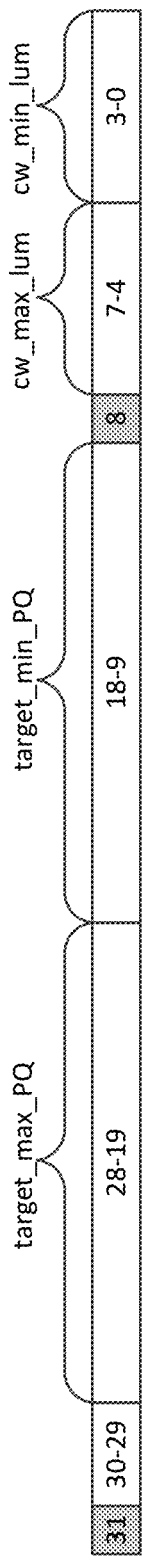
FIG. 2A depicts an example of mapping luminance values for a targeted display using CRI messaging according to an embodiment of this invention.

In an embodiment, one may use the lowest 8 bits of colour_remap_id (e.g., bits 7:0) to specify a fixed set for these values. Since colour_remap_id is coded with ue(v) (that is, unsigned integer 0-th order Exp-Golomb syntax elements), the parsing process need to be invoked first to decode the binary value of the syntax elements. In a binary representation of the variable colour_remap_id; bits 0 to 3 (or 3:0) are used to map target_min_lum to codeword cw_min_lum, and bits 4 to 7 (7:4) are used to map target_max_lum to codeword cw_max_lum. When cw_min_lum equals to a reserved value (e.g., 15 or any other legal value), bits 9 to 18 (18:9) is used to specify target_min_PQ. In an embodiment, as an example and without limitation, when cw_max_lum equals a reserved value (e.g., 15 or any other legal value), bits 19 to 28 (28:19) may be used to specify the target_max_PQ value. Such a mapping is depicted in FIG. 2A.

More specifically, $$cw\_min\_lum = colour\_remap\_id\ \&\ 0x0F;$$

$$cw\_max\_lum = (colour\_remap\_id\ \&\ 0xF0) \gg 4; \quad (1)$$

if (cw_min_lum==15)

$$target\_min\_PQ = (colour\_remap\_id\ \&\ 0x7FE00) \gg 9; \quad (2)$$

if (cw_max_lum==15)

$$target\_max\_PQ = (colour\_remap\_id\ \&\ 0x1FF80000) \gg 19; \quad (3)$$

where a$\gg$n denotes an arithmetic right shift of binary value a by n binary positions, or dividing a by $2^n$, and & denotes a bit-wise "and."

In an embodiment, a logarithmic table may be generated using the following sample Matlab code:

target_max_lum=log space(2,4,15);

target_min_lum=log space(−4,1,15);   (4)

where the Matlab function y=log space(a, b, n) generates n points between decades $10^a$ and $10^b$. An example of such a table is depicted in Table 1.

Table 2 provides an example mapping of colour_remap_id to target_min_lum and target_max_lum using values that are closer to values associated with television sets in the market. Table 3 depicts a subset of Table 2, but with values 9-14 reserved. Finally, in an example, in Table 4, the minimum luminance is set to a fixed value (e.g., 0.005 or 0.5 nits) and one may just extract the target_max_lum value using cw_lum=(colour_remap_id & 0xFF). Table 4 attempts to cover typical luminance ranges that may be used in the workflow of SDR and HDR content, such as:

a) SDR content: 0.005 to 100 nits
b) Consumer TV with local/global dimming: 0.005 to 300-500 nits
c) Tablet/mobile phone/TV without dimming: 0.5 to 500 nits
d) Dolby's PRM Monitor: 0.005 to 600 nits
e) HDR10 content: 0.005 to 1000 nits
f) HDR monitor: 0.005 to 2000 nits
g) HDR monitor: 0.005 to 4000 nits
h) The full PQ dynamic range: 0.005 to 10000 nits In H.265, the variable transfer_characteristics may be used to indicate the opto-electronic transfer characteristics of the source picture as specified in Table E.4, as a function of a linear optical intensity input Lc with a nominal real-valued range of 0 to 1. For PQ-coded information, transfer_characteristics=16. After extracting target_min_lum and target_max_lum from bits 18:9 and 28:19, the PQ-coded luminance values may be generated as:

target_min_$PQ$=Clip3(0,1023,round($PQ$(target_min_lum/10000)*1023));   (5a)

target_max_$PQ$=Clip3(0,1023,round($PQ$(target_max_lum/10000)*1023));   (5b)

where function PQ( ) is specified in both Table E.4 of H.265 or in ST 2084 as $PQ(L_o) = ((c1 + c_2 * L_c^n) \div (1 + c_3 * L_c^n))^m$ for all values of $L_c$ $c_1 = c_3 - c_2 + 1 = 3424 \div 4096 = 0.8359375$ $c_2 = 32 * 2413 \div 4096 = 18.8515625$ $c_3 = 32 * 2392 \div 4096 = 18.6875$, $m = 128 * 2523 \div 4096 = 78.84375$ $n = 0.25 * 2610 \div 4096 = 0.1593017578125$   (6)

for which $L_c$ equal to 1 for peak white is ordinarily intended to correspond to a reference output luminance level of 10,000 candelas per square meter (nits). Functions Clip3( ) and round( ) may be defined as:

$$\text{Clip3}(x, y, z) = \begin{cases} x; & z < x \\ y; & z > y \\ z; & \text{otherwise} \end{cases}$$

and $\text{round}(x) = \text{Sign}(x) * \text{Floor}(\text{Abs}(x) + 0.5)$.

In another embodiment, the target_max_PQ and target_min_PQ fields may be coded using linear luminance values or luminance values coded in some other linear or non-linear representation, such as gamma, HGL, and the like.

TABLE 1

First example for luminance mapping for a targeted display using CRI messaging

| cw_min_lum or cw_max_lum | target_min_lum | target_max_lum |
|---|---|---|
| 0 | 0.0001 | 100 |
| 1 | 0.0002 | 139 |
| 2 | 0.0005 | 193 |
| 3 | 0.0012 | 268 |
| 4 | 0.0027 | 373 |
| 5 | 0.0061 | 518 |
| 6 | 0.0139 | 720 |
| 7 | 0.0316 | 1000 |
| 8 | 0.0720 | 1389 |
| 9 | 0.1638 | 1931 |
| 10 | 0.3728 | 2683 |
| 11 | 0.8483 | 3728 |
| 12 | 1.9307 | 5179 |
| 13 | 4.3940 | 7197 |
| 14 | 10.0000 | 10000 |
| 15 | refer to bits 9 to 18 (target_min_PQ) | refer to bits 19 to 28 (target_max_PQ) |

TABLE 2

Second example for luminance mapping for a targeted display using CRI messaging

| cw_min_lum or cw_max_lum | target_min_lum | target_max_lum |
|---|---|---|
| 0 | 0.0001 | 100 |
| 1 | 0.0002 | 150 |
| 2 | 0.0005 | 200 |
| 3 | 0.0010 | 300 |
| 4 | 0.0020 | 500 |
| 5 | 0.0050 | 600 |
| 6 | 0.0100 | 800 |
| 7 | 0.0500 | 1000 |
| 8 | 0.1000 | 1500 |
| 9 | 0.2000 | 2000 |
| 10 | 0.5000 | 3000 |
| 11 | 1.0000 | 4000 |
| 12 | 2.0000 | 5000 |
| 13 | 5.0000 | 8000 |
| 14 | 10.0000 | 10000 |
| 15 | refer to bits 9 to 18 (target_min_PQ) | refer to bits 19 to 28 (target_max_PQ) |

TABLE 3

Third example for luminance mapping for a targeted display using CRI messaging

| cw_min_lum or cw_max_lum | target_min_lum | target_max_lum |
|---|---|---|
| 0 | 0.0001 | 100 |
| 1 | 0.0005 | 300 |
| 2 | 0.0010 | 600 |
| 3 | 0.0050 | 800 |
| 4 | 0.1000 | 1000 |
| 5 | 0.5000 | 2000 |

TABLE 3-continued

Third example for luminance mapping for
a targeted display using CRI messaging

| cw_min_lum or cw_max_lum | target_min_lum | target_max_lum |
|---|---|---|
| 6 | 1.0000 | 4000 |
| 7 | 5.0000 | 8000 |
| 8 | 10.0000 | 10000 |
| 9-14 | reserved | reserved |
| 15 | refer to bits 9 to 18 (target_min_PQ) | refer to bits 19 to 28 (target_max_PQ) |

TABLE 4

Fourth example for luminance mapping for
a targeted display using CRI messaging

| cw_lum | target_min_lum, | target_max_lum |
|---|---|---|
| 0 | 0.005 | 100 |
| 1 | 0.005 | 300 |
| 2 | 0.005 | 400 |
| 3 | 0.005 | 500 |
| 4 | 0.5 | 500 |
| 5 | 0.005 | 600 |
| 6 | 0.005 | 1000 |
| 7 | 0.005 | 2000 |
| 8 | 0.005 | 4000 |
| 9 | 0.005 | 10000 |
| 10-254 | reserved | reserved |
| 255 | refer to bits 9 to 18 (target_min_PQ) | refer to bits 19 to 28 (target_max_PQ) |

Figure 3:
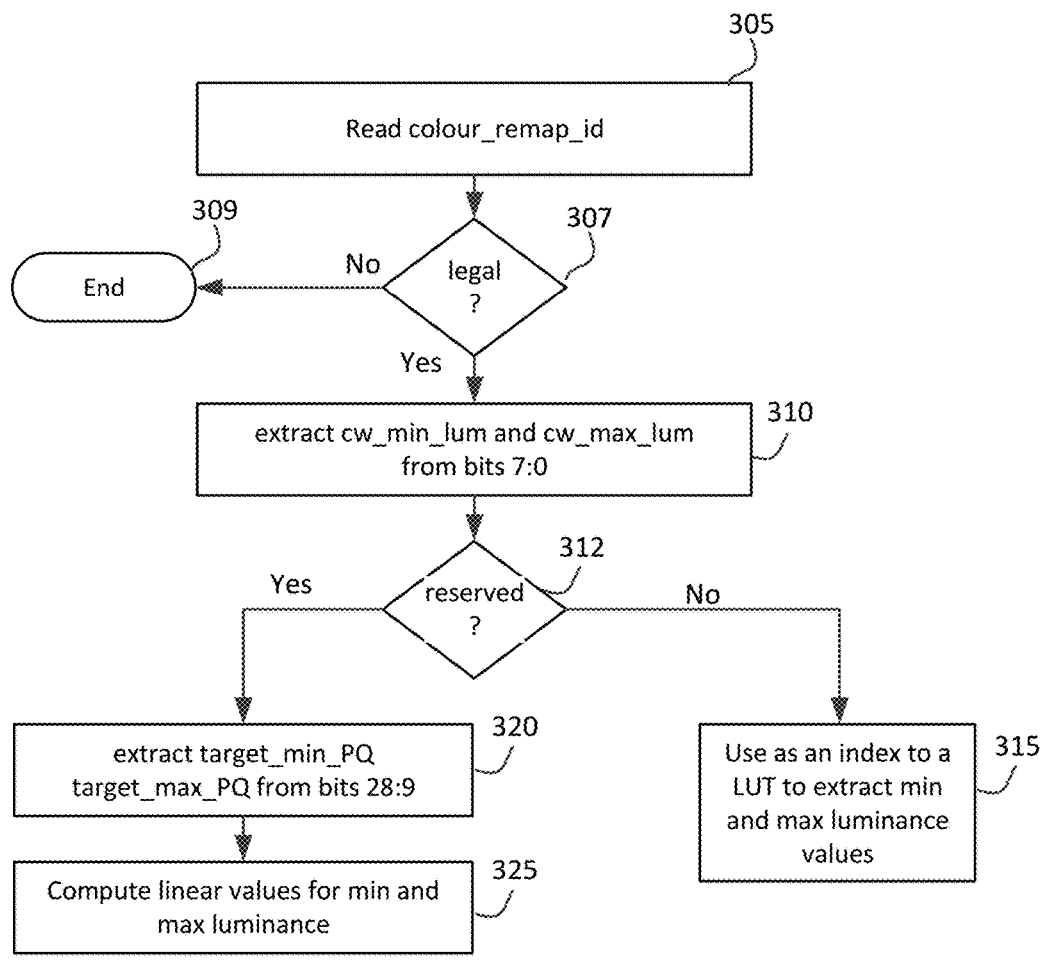
FIG. 3 depicts an example process for extracting luminance data for a targeted display from CRI messaging according to an embodiment of this invention.

FIG. 3 depicts an example process for decoding luminance information from the colour_remap_id CRI SEI message according to an embodiment. Given an input colour_remap_id value (step 305), a decoder may check first (step 307) whether this value is within the permissible H.265 ranges: 0 to 255 and 512 to $2^{31}-1$. If it is an illegal value, then the process terminates (step 309). If it is a legal value, then in step (310) the decoder can extract from bits 7:0 the values of cw_min_lum and cw_max_lum, as depicted in FIG. 2A or equation (1). Next, (step 312), the decoder may check whether these two values point to a "special" or "reserved" value (e.g., "15"). If not, then, in step 315, these values are used as an index to a look-up table (LUT) to extract the minimum and maximum luminance values of the targeted display (e.g., via Table 1, 2, 3, or 4). If these values are special, then appropriate special processing may be performed. For example, if the numbers indicate that colour_remap_id incorporates luminance values in a PQ representation, then the decoder, in step (320), uses fields 28:9 to extract these values as depicted in FIG. 2A or equations (2)-(3). In step (325), PQ-coded values may be converted to linear values using equation (5)-(6). In another embodiment, one may use the full range of bits 9 to 31 to communicate PQ or otherwise-coded values.

B. Carrying Luminance and Color Primaries Information

Figure 2B:
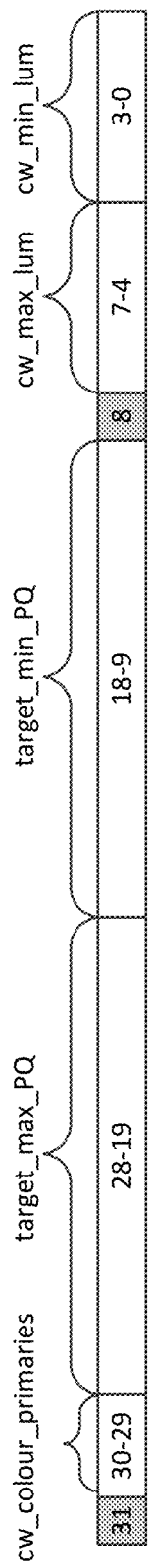
FIG. 2B depicts an example of mapping luminance values and color primaries for a targeted display using CRI messaging according to an embodiment of this invention.

Table E.3, "Colour primaries," of H.265 specifies eight different color primaries, such as BT. 709, BT. 2020, and SMPTE 240M. Since it may take some time for displays to be fully classified as BT. 2020, one may see in the market displays with color characteristics in between "DCI-P3" (defined in SMPTE EG 432-1 and SMPTE RP 431-2) and BT. 2020. In an embodiment, a number of such target display primaries may also be defined as part of the colour_remap_id message. FIG. 2B depicts an example of mapping luminance values and color primaries for a targeted display using CRI messaging according to an embodiment.

As depicted in FIG. 2B, bits 29-30 (30:29) of the colour_remap_id are used as an index to a table with up to four possible new color primaries, that is, primaries not defined in Table E.3. The index (denoted as cw_colour_primaries) can be generated as $$cw\_colour\_primaries=(colour\_remap\_id \ \& \ 0x60000000)>>29; \quad (7)$$

In addition, to comply with H.265, the SEI messaging variable colour_remap_primaries should be set to 2 (unspecified).

Color primaries are typically defined with a pair of (x,y) chromaticity values for each of the three color primaries and the white point, for a total of eight values In another embodiment, one could define another reserved codeword in bits 0 to 7 (e.g., in Table 4, let cw_lum=10) to indicate that bits 9-30 are used to explicitly communicate some of or all of those chromaticity values. These values may be coded explicitly, or perhaps in reference to the BT.2020, some other color primary, or a predetermined set of values. For example, for green, in BT.2020 (x,y)=(0.170, 0.797). If the targeted monitor has green (x=a, y=b), then one can simply code (0.170-a, 0.797-b). Since the monitors are expected to be close to BT.2020, ignoring the white-point coordinates, one will only need to have to communicate six relatively small values. These values may also be further scaled or quantized for improved coding efficiency.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to communicating color-volume information of a targeted display using CRI messaging, such as those described herein. The computer and/or IC may compute any of a variety of parameters or values that relate to the processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to communicating color-volume information of a targeted display using CRI messaging as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to communicating color-volume information of a targeted display using CRI messaging are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method on a decoder to extract color volume information for a targeted display, the method executed on a processor, the method comprising:
   by apparatus comprising one or more data processors configured by software, one or more programmable logic devices, one or more logic circuits or a combination thereof:
   receiving a colour_remap_id messaging variable identifying color remapping information, wherein the colour_remap_id messaging variable comprises 32 bits;
   generating a first value based on bits 7:0 of the colour_remap_id messaging variable;
   checking whether the first value is a reserved value;
   if the first value is not the reserved value, then using the first value as an index to a look-up table to generate a first luminance value for a targeted display, otherwise
   generating a second value based on bits 31:9 in the colour_remap_id messaging variable; and
   generating the first luminance value for the targeted display based on the second value.

2. The method of claim 1, wherein the first luminance value comprises the minimum or the maximum luminance value of the targeted display.

3. The method of claim 1, wherein the first value is generated based on bits 3:0 of the colour_remap_id value and the second value is generated based on bits 18:9 of the colour_remap_id value.

4. The method of claim 1, wherein the second value is encoded according to the inverse EOTF specified in SMPTE ST 2084.

5. The method of claim 4, wherein generating the first luminance value for the targeted display comprises computing:

$PQ(\text{target\_min\_lum}/10{,}000),$ wherein target_min_lum denotes the second value and PQ(x) denotes a function mapping input x values to output luminance values according to the EOTF defined in SMPTE ST 2084.

6. The method of claim 3, wherein the reserved value comprises the value 15.

7. The method of claim 3, wherein the LUT for the first value comprises 15 values in logarithmic space, between 0.0001 and 10,000.

8. The method of claim 3, wherein the LUT for the first value comprises the values 0.5 and 0.05.

9. The method of claim 1, further comprising:
   generating a third value based on bits 7:0 of the colour_remap_id messaging variable;
   checking whether the third value is the reserved value;
   if the third value is not the reserved value, then using the third value as an index to the look-up table to generate a second luminance value for the targeted display, otherwise
   generating a fourth value based on bits 31:9 in the colour_remap_id messaging variable; and
   generating the second luminance value for the targeted display based on the fourth value.

10. The method of claim 9, wherein the third value is generated based on bits 7:4 of the colour_remap_id value and the fourth value is generated based on bits 28:19 of the colour_remap_id value.

11. The method of claim 9, wherein the fourth value is encoded according to the inverse EOTF specified in SMPTE ST 2084.

12. The method of claim 1, further comprising:
   generating a color primaries index value based on bits 30:29 of the colour_remap_id messaging variable; and
   generating one or more chromaticity values for the color primaries of the targeted display based on the color primaries index value.

13. An apparatus comprising a processor and configured to perform the method recited in claim 1.

14. A non-transitory computer-readable storage medium having stored thereon computer-executable instruction for executing a method with one or more processors in accordance with claim 1.

* * * * *